fig.1 fig. 2 fig. 3 fig. 4 fig. 5 fig. 6

United States Patent Office 3,117,020
Patented Jan. 7, 1964

3,117,020
PROCESS FOR THE SPHERICAL GRANULATION
OF WATER-SOLUBLE NITROGENOUS MATERIAL
Temistocle Fabris and Tito Borelli, Milan, and Ciro
Schiavello and Oreste Bagnati, Novara, Italy, assignors
to Montecatini Societa Generale per l'Industria Mineraria e Chimica, Milan, Italy
Filed Oct. 21, 1958, Ser. No. 768,721
Claims priority, application Italy Nov. 29, 1957
3 Claims. (Cl. 117—100)

The present invention relates to the granulation of urea and ammonium nitrate or mixtures of each of these compounds with inert diluents or fertilizers on a rotating plate.

More particularly the invention relates to a process for the preparation of homogeneous granular urea having a minimum tendency to agglomerate, and of perfectly spherical granular ammonium nitrate, the granules of which are hard, homogeneous and compact.

It is known that one of the great difficulties in the commercial use of powdered urea and ammonium nitrate lies in the fact that these materials absorb the humidity of the air easily and tend to agglomerate, thus hindering their use as a commercial product and their utilization as fertilizers.

Various processes for the granulation of urea have been heretofore proposed, but without succeeding in obtaining a granular urea which is completely stable when stored and which maintains its properties of perfectly free-flowing granular particles even after long periods of storage.

It is therefore an object of the present invention to provide a process which renders possible the obtainment of granular urea and ammonium having the aforementioned characteristics.

A further object of the present invention is to provide a simple apparatus for performing the process.

To these ends, and in accordance with one feature of the invention, the process consists of spraying a concentrated solution of urea, or ammonium nitrate respectively, either alone or in admixture with the respective diluents, onto a plate which can rotate at a variable slant at a suitable temperature, and on which plate the material solidifies from its solution, thus forming the granules and eliminating practically almost all the water therefrom. For varying the angle of slant of the rotating plate, apparatus similar to that disclosed in U.S. Patent No. 2,860,598 of Loesche may be employed. Such apparatus forms no part of the present invention.

The granulation is regulated by a thermal control provided on the rotating plate, which control determines the potential output of the plate and is obtained essentially by recycling the previously cooled fine granules.

The above mentioned and further objects, advantages and features of the invention will be apparent from the following description of the embodiments shown by way of example on the accompanying drawings, in which.

The same reference characters in the various figures represent the same or similar elements.

The process for the production of granular urea by means of a rotating plate according to the present invention can be divided into the following stages:

(a) Concentration of the urea solution
(b) Pumping
(c) Granulation
(d) Sieving
(e) Cooling The concentration of the urea solution is carried out in a conventional type concentrator, e.g., a vacuum concentrator.

Figure 1:
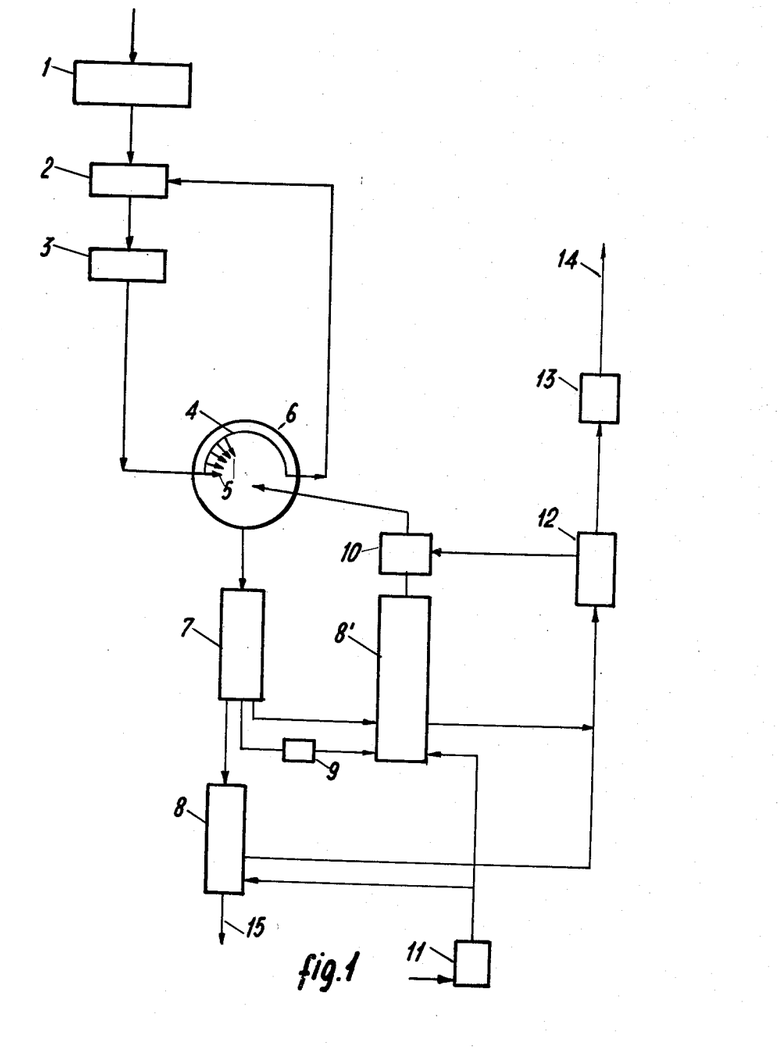
FIG. 1 is a schematic representational view of the apparatus for the granulation of urea by means of a rotating plate.

The dilute solution taken from the urea plant at a concentration of about 80%, is collected in a tank (not shown and from there pumped to concentrator 1 (FIG. 1).

The concentrated solution is collected in another tank which also has the function of a "lunge" or surge receptacle for the liquid column in the fall pipe of the concentrator, the height of which varies depending on the vacuum in the concentrator.

From concentrator 1 the urea solution then passes to a filter 2 and successively to a centrifugal pump 3 which leads it to the sprayer-carrying ring 4 on a rotating plate 6 while the excess solution returns to filter 2.

The solution is then finely divided and sprayed by means of sprayers 5, into a determined zone of the mass of forming granules.

The distribution of the solution takes place in the upper left zone A of plate 6 (FIG. 5) by clockwise rotation of the same.

Figure 5:
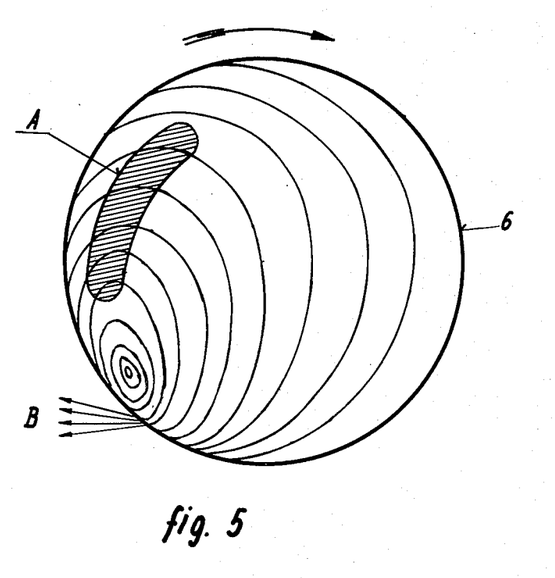
FIG. 5 illustrates the respective path of movement of the granules of increasing size on the rotating plate.

Plate 6, when the spraying of the solution is started, should already be charged with material (crystalline urea or, better, granular urea consisting of small granules) and in rotation; the rotation and slanting of the plate during a regular run determines a vortex of granules whose center takes a position in the lower left zone of the plate (FIG. 5).

In the central zone of the vortex the biggest granules collect, while the granules of a gradually decreasing size twirl along concentric spirals which grow gradually outward from the center to a position where the finest or powdered material runs along a circular trajectory close to the edge of plate 6.

The solution is therefore distributed in this manner and covers a zone A crossed by the trajectories of the various sized granules, so that each of the granules is covered by the liquid, and consequently become bigger and bigger, passing from an upper trajectory to a lower one until it reaches the one leaving the edge of the plate in points B and is ejected therefrom by centrifugal force to screen 7 after having reached the established predetermined size.

In actual practice, the aforementioned classification takes place only in part so that, together with the finished granules of predetermined size, also other smaller ones are ejected from the plate, and these are then recycled on the plate 6, in order to reach the desired size by further passing them under the solution spray.

On the plate 6, in addition to the increase of size of the granules under formation, there also takes place a continuous production of other very small granules due to the fact that the smallest drops of the solution coming from the sprayers solidify before reaching the mass of granules and also due to the breaking up of portions of the granules already formed.

The continuous production of such small granules is essential for the granulation process, since these form the nuclei of the finished granules and their absence would cause the continuous growing of those granules already formed, which would then quickly exceed the desired size.

The process of formation of the granule and of its becoming round is regulated by given working conditions of the plate 6. The size of the granule depends on the rotation speed, on the degree of slanting and on the height of the outer edge of the plate, and these factors must be suitably regulated.

By increasing the degree of slanting, the size of the granule is reduced, while by increasing the height of the outer edge and the speed of rotation the size of the granules is increased.

However, in practice, regulation of only one of the aforementioned factors is not sufficient for the purpose and therefore regulation of a number of these factors should be done particularly for obtaining a considerable variation in the granule size.

Usually it is better to vary the slanting angle of the plate and suitably correcting the rotation speed, the edge height being previously fixed for a given granule size.

For these reasons the granulator, according to the invention, is provided with a regulable slanting device, with an edge on the plate having a variable height and with a continuous speed variator.

It should also be pointed out that in order to obtain the same results as those obtained with a plate having a certain diameter, but using another plate with a greater diameter, the ratio $V^2/r$, that is the centrifugal force of the granules on the plate bottom, should be kept constant.

The formation, the growing and the rounding of the granules take place under the following conditions:

The temperature of the bed of granules on the plate has such a value that the sprayed liquid, impacting the granules coats them and becomes solidified but nevertheless the mass remains in the plastic state for a while.

Under these conditions the granule becomes progressively bigger and, rolling in the mass, it assumes a spherical shape.

The temperature of the granular bed depends on the concentration of the solution sprayed onto the place, and is increased as the concentration of said solution increases.

The best concentration results in practice of about 94%, but the limits within which the granulation takes place range from 92% to 95% and above. At lower concentrations the granule mass takes on an excessive humidity which, with very low concentrations, can lead to the destruction of the granules.

At high concentrations an increase of temperature occurs on the plate since there is a reduction in the heat removal due to the evaporation of the water contained in the solution, thus resulting in the melting of the mass. With concentrations of about 94% the temperature of the plate should be maintained at between 85° and 95° C. If the temperature is lower the granule loses its spherical shape and becomes irregular, since the solution droplets, in contact with the cold granule, solidify more quickly without having the time for uniformly coating it.

If the temperature is too high the mass of granules tends to melt and there results therefore initially an irregular classification, followed, if the temperature increases further, by the adhesion of the granules to each other and by the melting of the whole mass.

As mentioned above, the finely divided solution leaving the sprayers 5 loses most of its water; the rest of the water evaporates on the bed of granules due to the existing temperature and to the natural ventilation generated by the rotation of the plate and the movement of the granules.

Operating at the aforementioned concentration and temperature, a product with a moisture content lower than 1% is obtained at the discharge of the rotating plate 6.

The evaporation of water during the spraying of the solution and on the plate causes a considerable subtraction of heat and makes it possible to avoid the use of a separate or special apparatus for drying the product.

In fact, the amount of heat introduced onto the plate and due to the sensible heat of the solution and to the crystallization heat of urea, would produce a continuous and quick increase of the temperature of the mass up to its melting point, if a balance between introduced heat and subtracted heat would not be established.

Moreover, if one desires to take advantage of the entire whole potential of the plate, the natural heat losses are not sufficient to create a balance, and therefore a portion of heat must be removed in another way.

It has been found that the most simple and effective manner or removing heat from the plate and meanwhile regulating the temperature on it, is to cool the fine product to be recycled by passing it through a fluidized bed cooler apparatus.

In this latter apparatus the regulation of temperature of the recycled product can be carried out in various ways, and precisely:

(a) By varying the air flow to the fluidizer within the limits which assure the fluidization of the product;
(b) By varying the amount of the salt to be recycled by a suitable control of the granuler size of the product leaving the plate;
(c) By varying the temperature of air.

The most effective system is obviously the first one which, however, is effective for moderate variations of temperature. This system can be combined with the second one, thus effecting a combined regulation which has given satisfactory results in practice. The third system presupposes an apparatus for varying the air temperature and is therefore scarcely convenient.

At the outlet of the rotating plate granulator 6 the product, being practically dry, is conveyed to a vibrating screen 7 provided with two nets having meshes of 3.5 mm. and 2 mm. respectively.

The granular size of the product at the screen inlet is the following:

|  | Percent |
|---|---|
| 1 to 2 mm | 56 to 60 |
| 2 to 3.5 mm | 35 to 45 |
| 3.5 to 5 mm | 0 to 5 |
| >5 mm | ------- |

The vibrating screen 7 discharges the finished product and the fine powder into the respective fluidized bed coolers 8 and 8' while the large granules pass to the mill 9 where they are ground and transformed into a fine product which is conveyed to cooler 8' and then recycled onto the rotating plate 6.

It should be noted that the percentage of the recycled product must be necessarily kept high in order to obtain, by its cooling, the highest utilization of the potential capacity of the plate and the regulation of the thermal range on it.

The fine product, as we have already said, after passage through the cooler by means of elevator 10 to the plate, where it grows until it reaches the desired size.

Figure 6:
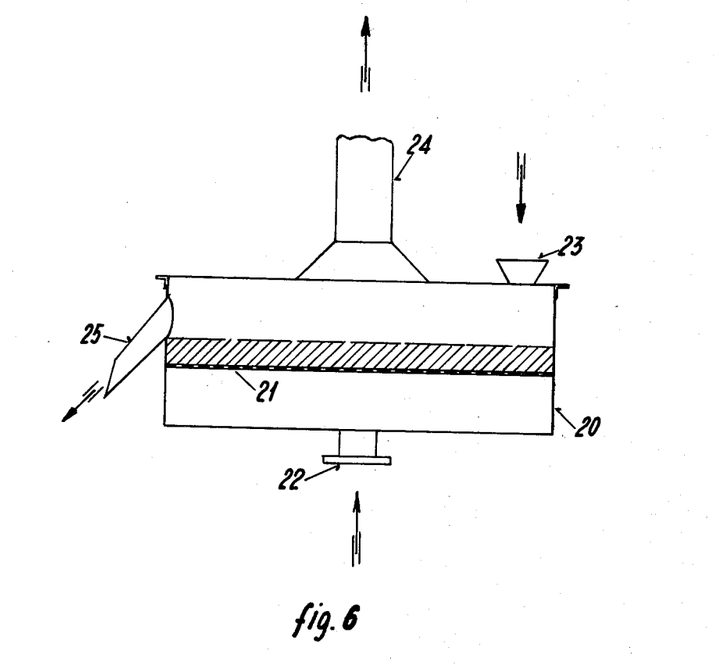
FIG. 6 represents a vertical section of the fluidized bed cooler.

Coolers 8 and 8', one of which is represented as in vertical section in FIG. 6, comprise a plate box 20 divided into two parts by a horizontal grate 21; into the lower part, which is air tight, air under low pressure is introduced through the inlet opening 22 while the product to be cooled is introduced into the upper part through opening 23.

Numbers 24 and 25 designate the outlets of the air and of the cooled product respectively.

The air, passing through the grates 21, impinges on the product and puts it in movement by passing through it. The height of the product upon the grate is kept at about 10–15 cm. and the apparatus is slightly slanted towards the outlet in order to favour the advancing of the material by gravity.

The air pressure under the grate 21 is approximately 300 mm. of water column and serves to manitain a regular distribution of the air at the outlet of the grate.

The fluidizer simultaneously effects the cooling and drying of the product, the dust separation and the transport of the product.

The drying takes place by utilizing heat which the material itself gives up to the air.

The dust separation caused by the air stream coming from fan 11 (FIG. 1) and which passes through the material, takes place in the first portion of the apparatus and therefore the apparatus for recovering the dust is supplied only for a fraction of the air which enters the fluidizer while the remaining material is discharged directly in the air.

The air leaving the fluidizers is sucked by a centrifugal ventilator 13 mounted after the cyclone (centrifugal dust separator) 12 and discharged outside of the apparatus at 14.

The granular urea coming from cooler 8 (FIG. 1) is homogeneous and has a regular shape; its granules which tend to be spherical are very hard and compact and can be immediately conveyed to a sacking operation 15.

The biuret content of the final product varies from 0.5 to 0.8%. Such a value exists already in the urea solution at the outlet of concentrator 1 and does not undergo any notable variation after the granulation.

The average moisture content of the product leaving the plate is of approximately 0.5% with a minimum of 0.3%. A specific drying device is therefore not necessary since the passage of the product through the fluidized bed cooler 8 is sufficient for a complete drying.

On the same rotating plate and on the basis of the present invention, technical ammonium nitrate with 35% $N_2$ and agricultural ammonium nitrate with 20.5% $N_2$ have been granulated starting from concentrated ammonium nitrate solutions with a 93–95% content of dry product, operating on the plate at temperatures ranging between 95 and 105° C., obtaining results similar to those described for the granulation of urea.

The process according to the present invention is therefore suitable also for the continuous production of granular ammonium nitrate.

Figure 2:
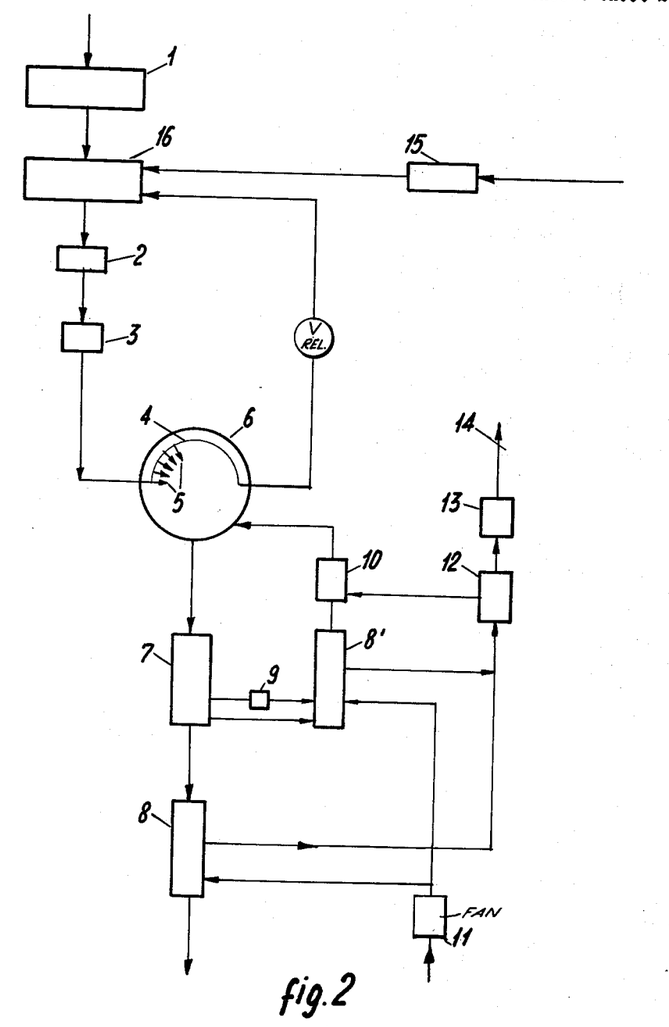
FIG. 2 represents a view similar to FIG. 1, but in which a urea-limestone mixer has been inserted, the illustrated apparatus serving to granulate urea-limestone mixtures.

With reference to FIG. 2 in which is schematically illustrated a plant for the production of granular limestone-urea mixture by means of a rotating granulating plate, it should be noted that it is identical with the plant of FIG. 1 for the production of granular technical urea, except for some modifications which do not alter the fundamental concept of the present invention. As a matter of fact the apparatus illustrated in FIG. 2 is suitable for the production of granular limestone-urea mixture as well as for the production of granular technical urea without the need for any modification, except for the exclusion of the limestone feeder and of the limestone-urea mixer.

Figure 4:
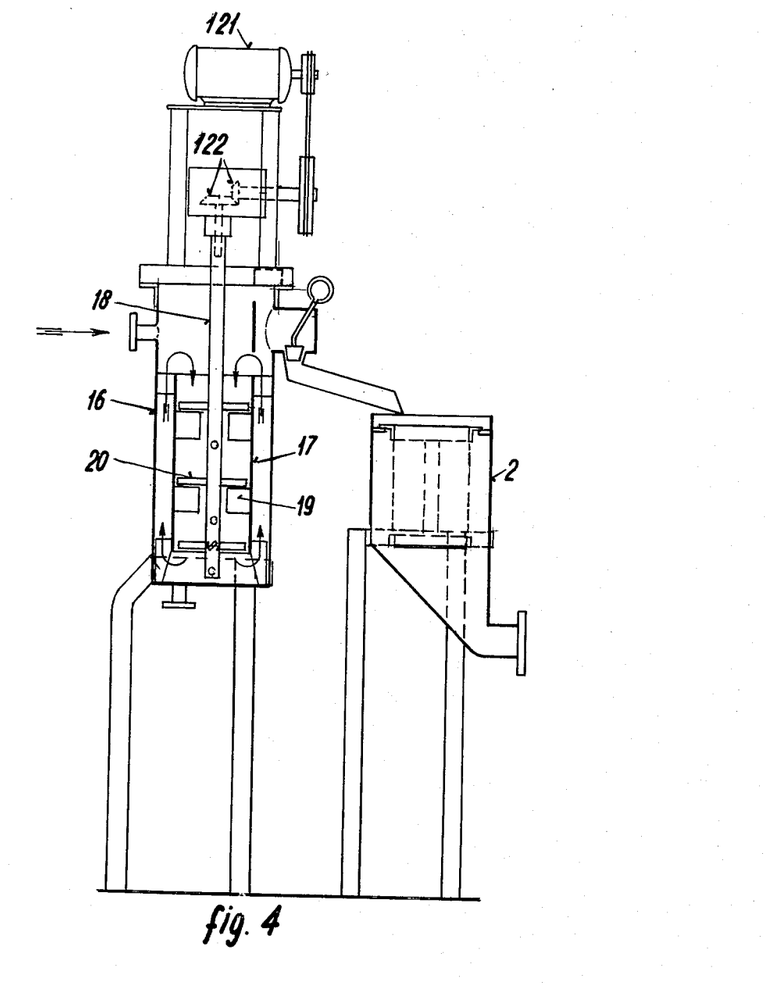
FIG. 4 is a vertical section of the mixer and of the filter for the urea-limestone mixture.

Operation of the apparatus is as follows:

The concentration of the urea solution up to 80% is carried out in the concentrator 1 (FIG. 2). The best concentration appears to be between 91% and 93%. The urea solution thus obtained passes to the mixer 16 provided with filter 2 to which arrives also the powdered limestone from feeder 15 consisting of a screw provided with a hopper. The mechanical propeller mixer 16 (FIG. 4) is supplied with an inner jacket 17. The shaft 18 of the mixer carries a 4-bladed propeller 19 at its end and small bars 20 distributed on the upper part of the blades for agitating the mixture. The control is effected by motor 121 through a pair of bevel gears 122. The limestone-urea mixture leaving the mixer 16 passes through the filter 2 (FIG. 4) consisting of a barrel with conical bottom in which a basket filter provided with interchangeable net is placed, and then to the centrifugal pump 3 (FIG. 2) which conveys it to the sprayer carrying ring 4 where a portion is sprayed by the sprayer 5 while the excess returns to mixer 16 (FIG. 2).

The limestone-urea mixture is distributed in a finely divided state on the left zone of the plate 6 (FIG. 5) where the formation of granules of limestone-urea takes place and its becoming spherical as above described for the granulation of urea.

The granules which leave the granulator 6 have the following average granular size:

| | Percent |
|---|---|
| 1 to 2 mm | 35 to 45 |
| 2 to 3.5 mm | 50 to 60 |
| 3.5 to 5 mm | 3 to 8 |
| >5 mm | |

Under the best operating conditions, when the plate is perfectly regulated, percentages of finished product, i.e. having a desired granular size between 2 and 3.5 mm., of higher than 70% are obtained, with a practically negligible course refuse.

The granules leaving the granulator 6 and having the aforementioned granular size are subjected to sieving on screen 7. The mean size product (2 to 3.5 mm.) after cooling in the fluidized bed cooler 8 is the finished product which is sacked; the fine product (<2 mm.) is cooled in cooler 8' and then, by means of elevator 10, recycled onto the rotating plate 6 in order to remove heat therefrom. The course product is ground in mill 9 and then passes with the fine product to cooler 8' and finally recycled onto the rotating plate. The cycle of the cooling air is identical with that above described for the production of granulated urea. The granular limestone-urea mixture obtained by the process according to the invention is homogeneous and has an almost spherical regular shape; the granules are very hard and compact. The $N_2$ content is of approximately 26%. The biuret content is in the range between 0.6 and 1%. The moisture content varies from 0.4 to 1% and can be maintained at approximately the lower value by suitably regulating the fluidizers and operating with an urea solution having a concentration of about 92%.

The dry and cooled product has no tendency to agglomerate. Very good results have been obtained from experiments of continuous granulation of mixtures of ammonium nitrate with inert diluents (e.g. limestone, calcium sulphate, silica flour, etc.) for obtaining granular fertilizers with a reduced $N_2$ content, and of mixture of ammonium nitrate with potassium salts or phosphate fertilizers for the production of complex fertilizers, using the apparatus illustrated in FIG. 2 and the process according to the present invention.

It is therefore evident that the process and the apparatus according to the present invention are suitable also for the continuous granulation of mixtures of ammonium nitrate with inert diluents or with diluents consisting of fertilizers.

The average operative data of the process for the production of granular urea and limestone-urea are shown in the following Tables I and II.

Table I
PRODUCTION OF GRANULAR TECHNICAL UREA WITH A N₂ CONTENT OF 46% ON A ROTATING PLATE

| Characteristics | Units | Amount |
|---|---|---|
| Production | kg. per hour | 385. |
| Concentration of the urea solution (dry matter) | Percent | 94. |
| Temperature of the urea solution | °C | about 120. |
| Temperature of the plate | °C | about 90. |
| Temperature of the granulated product leaving the plate | °C | about 90. |
| $H_2O$ content of the granulate leaving the plate | Percent | about 0.4. |
| Amount of the recycled fine product | kg. per hour | 650. |
| Temperature of the recycled fine product | °C | 65. |
| Specific heat of the 94% solution | kcal./kg./°C | 0.36. |
| Specific heat of the granulated salt | kcal./kg./°C | 0.34. |
| Crystallization heat of urea | kcal./kg | 60. |
| Surface of the plate having diameter of 1,500 mm | m.² | 1.76. |

Table II
PRODUCTION OF GRANULAR MIXED LIMESTONE-UREA WITH A N₂ CONTENT OF 26% ON A ROTATING PLATE

| Characteristics | Units | Amount |
|---|---|---|
| Production urea about 280 kg./h. corresponding to limetsone 220 kg./h. | kg./h | 500 |
| Concentration of the urea solution | Percent | 92 |
| $H_2O$ content of the limestone-urea mixture | Percent | 4.5 |
| $H_2O$ content of the salt leaving the plate | Percent | 0.8 |
| Temperature of the limestone-urea mixture entering the plate | °C | 118 |
| Average temperature on the plate | °C | 100 |
| Average temperature of the salt leaving the plate | °C | 100 |
| Specific heat of the limestone-urea mixture | kcal./kg./°C | 0.32 |
| Specific heat of the granulated limestone-urea | kcal./kg./°C | 0.3 |
| Crystallization heat of urea | kcal./kg | 60 |
| Surface of the plate having a diameter of 1,500 mm | m.² | 1.76 |

Figure 3:
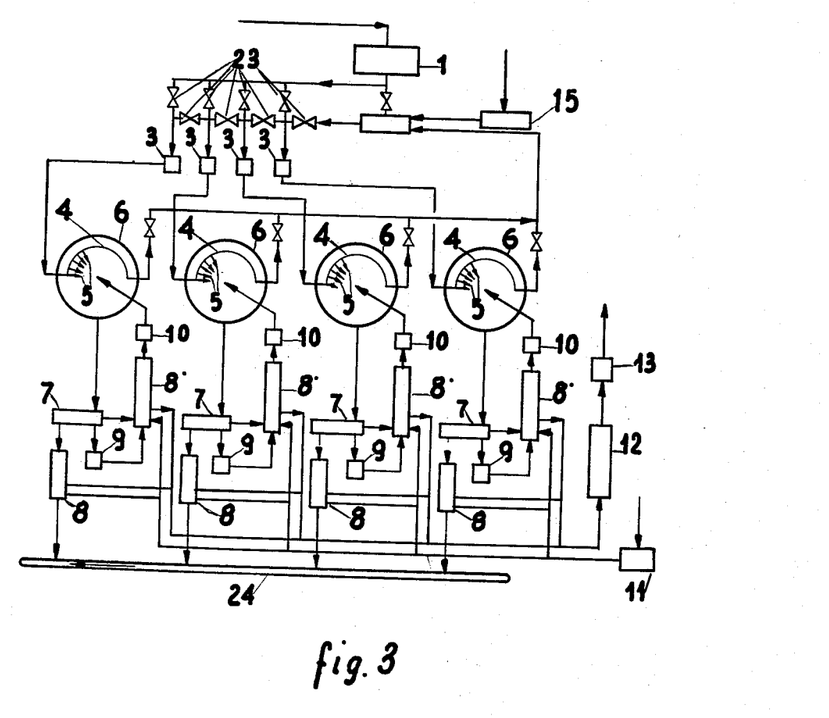
FIG. 3 illustrates schematically an apparatus provided with rotating plates working in parallel.

In FIG. 3 is illustrated a system with granulator plates working in parallel, which can be used for the continuous production of either granular technical urea and granular ammonium nitrate or limestone-urea as well as mixtures of ammonium nitrate with inert diluents or fertilizers, by optionally cutting out or inserting the diluent feeder 15 and the mixer 16 of the components to be granulated. In other words, with this apparatus one can pass from the production of granular technical urea to that of urea-calcium and vice-versa by simply inserting or excluding the urea-limestone mixer.

By suitably adjusting the gate valves 23 of the various products production can be practiced at the same time, feeding one or more plates 6 with one or the other product.

It should be noted that this plant with multiple plates as illustrated in FIG. 3 is provided with a single concentrator 1, a single fan 11 for the fluidizers as well as with a single dust removal system 12 and 13, while each plate 6 requires its own recycling system and cooling system since through these is realized the regulation of temperature on the plate and therefore the control of granulation. The conveyor belt 24 transports the finished product to the sacking operation.

The process described offers the following advantages for the production of granular urea and limestone-urea or of granular ammonium nitrate or mixtures thereof with diluents:

(a) Absence of any requirement of apparatus for drying the dry product which leaves the granulator;
(b) Excellent, almost spherical homogeneous and uniform product which is highly compact and therefore has a low specific volume with a minimum tendency to agglomeration;
(c) Apparatus consisting of small, simple, light and inexpensive devices;
(d) Simple working cycle with limited use of labor and consequent moderate cost.

The advantages and utility of having the product granulated into spherical form, as above described, are the following: The granules are free flowing; they are of uniform size; the granules have no tendency to cake or harden, even when stored for a long period of time; they need no addition of powders or other substances to prevent caking, and no drying or conditioning operation is necessary. Consequently the product produced by the method according to the invention is ideally suited for application to the soil as a fertilizer.

It will be obvious to those skilled in the art, upon a study of this disclosure, that this invention permits of various modifications and alterations with respect to the individual apparatus components and method steps disclosed, and hence can be embodied in equipment other than as particularly illustrated and described herein, without departing from the essential features of the invention and within the spirit and scope of the claim annexed hereto.

We claim:

1. A continuous process for the spherical granulation of a water-soluble solid nitrogenous material, comprising the steps of charging fine granules of said material onto a slanting rotating surface, spraying a 92 to 95% aqueous solution of said material onto said slanting rotating surface and forming a coating of multiple layers of the same material on said granules while heating said material by the heat of crystallization thereof to dry said coating, ejecting the coated granules by centrifugal force from said rotating surface, classifying by size the material ejected by centrifugal force from said surface and separating out therefrom the fines which are below a predetermined size, maintaining the temperature of said material on said surface between 90° and 130° C. by cooling said fines of the material while passing said fines through a fluidized bed cooler and then returning the cooled fines back onto said surface, controlling said fluidized bed cooler so as to maintain said fines being returned at a temperature lower than the temperature of said solution being sprayed, whereby a heat exchange takes place between the heat of crystallization of solidifying material forming said coating and the sensible heat of the liquid being sprayed on the one hand, and the cooled fines being returned on the other hand, and whereby a rolling motion is imparted to said granules by said slanting rotating surface to induce the formation of a spherical shape in the individual granules as said coating is formed thereon, and varying the degree of slant of said rotating surface so as to control the granular size of the material being ejected.

2. A continuous process for the granulation into spherical form of a predetermined granular size of a material containing as its active ingredient a compound selected from the group consisting of urea and ammonium nitrate, comprising the steps of charging fine seed granules of said material onto a slanting rotating surface, spraying onto said surface a 92 to 95% aqueous solution of said material having a temperature higher than said granules, solidifying out from said sprayed solution a coating of multiple layers of the same material onto said granules while heating said material by the heat of crystallization thereof to dry said coating, forming the coated granules into spherical shape by imparting a rolling motion to the granules during the coating operation by rotating said surface as said coating is formed thereon, ejecting the coated solid granules from said surface by centrifugal force, ejecting the fine solids from said surface by centrifugal force, and regulating the temperature of said surface between 85° and 130° by cooling said fine solids through a fluidized bed cooler to a temperature lower than the temperature of said solution being sprayed, recharging the cooled fine solids as seed granules back onto said surface, and collecting the coated solid granules ejected from said surface larger than said fine solids.

3. A continuous process for the spherical granulation of a water-soluble solid nitrogenous material, comprising the steps of charging fine seed granules of said material onto a slanting rotating surface spraying onto said slanting rotating surface a concentrated 91 to 95% aqueous solution of said material at a temperature above that of said seed granules, crystallizing out from the sprayed solution a coating of multiple layers of the same material onto said granules while heating said material by the heat of crystallization thereof to dry said coating, forming the coated granules into spherical shape by imparting a rolling motion to the granules during the coating operation by rotating said surface as said coating is formed thereon, ejecting the coated solid granules from said surface by centrifugal force, ejecting the fine solids from said surface by centrifugal force, separating out from the material ejected by centrifugal force from said surface the fines which are below a predetermined size, regulating the temperature of said surface between 85° and 130° C. by cooling said fines to a temperature below that of said concentrated aqueous solution being sprayed by passing said fines through an enclosed space separate from said surface, recharging the cooled fines back onto said surface, and varying the degree of slant of said rotating surface so as to control the granular size of the material being ejected therefrom.

References Cited in the file of this patent

UNITED STATES PATENTS

| | | |
|---|---|---|
| 1,671,866 | Linville et al. | May 29, 1928 |
| 1,977,628 | Hall | Oct. 23, 1934 |
| 1,982,549 | Stephensen et al. | Nov. 27, 1934 |
| 2,340,567 | Sargent | Feb. 1, 1944 |
| 2,402,192 | Williams et al. | June 18, 1946 |
| 2,436,771 | Hood | Feb. 24, 1948 |
| 2,561,392 | Marshall | July 24, 1951 |
| 2,726,959 | Lushbough et al. | Dec. 13, 1955 |
| 2,818,601 | Agarwal | Jan. 7, 1958 |
| 2,860,598 | Loesche | Nov. 18, 1958 |
| 2,979,421 | Rissman et al. | Apr. 11, 1961 |